(12) United States Patent
Nally et al.

(10) Patent No.: US 6,993,546 B2
(45) Date of Patent: Jan. 31, 2006

(54) QUANTIZED NONLINEAR SCALER

(75) Inventors: Robert M. Nally, McKinney, TX (US); Mark A. Fiechtner, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 684 days.

(21) Appl. No.: 09/998,829

(22) Filed: Dec. 3, 2001

(65) Prior Publication Data
US 2002/0118219 A1 Aug. 29, 2002

Related U.S. Application Data

(60) Provisional application No. 60/256,979, filed on Dec. 21, 2000.

(51) Int. Cl.
*G06F 17/17* (2006.01)
(52) U.S. Cl. ...................................................... 708/313
(58) Field of Classification Search ................ 708/300, 708/301, 313, 316, 319
See application file for complete search history.

(56) References Cited

U.S. PATENT DOCUMENTS

| | | | | |
|---|---|---|---|---|
| 5,018,090 A | * | 5/1991 | Shiratsuchi | 708/290 |
| 5,287,299 A | * | 2/1994 | Lin | 708/627 |
| 5,732,004 A | * | 3/1998 | Brown | 708/319 |
| 6,041,339 A | * | 3/2000 | Yu et al. | 708/313 |
| 6,442,580 B1 | * | 8/2002 | Machida | 708/313 |
| 6,681,059 B1 | * | 1/2004 | Thompson | 382/298 |

* cited by examiner

*Primary Examiner*—Chuong D. Ngo
(74) *Attorney, Agent, or Firm*—Robert D. Marshall, Jr.; W. James Brady, III; Frederick J. Telecky, Jr.

(57) ABSTRACT

A method of providing a low cost quantized nonlinear scaler for a continuous curve includes the steps of providing a quantized coefficient table representing an approximation of the nonlinear continuous curve; applying the table in hardware to locate coefficients in the table, and applying the coefficients to a scaling pipeline to get scaled data. The nonlinear approximation in the table is achieved by following the rules that the sampled data must be consistent, the quantization points must be consistent, the coefficient curve must be symmetric about its centerline, and the quantization values must be selected so that the sum of all coefficients values in the coefficient curve over all the source points for a given resultant point is always equal to a normalization value.

4 Claims, 6 Drawing Sheets

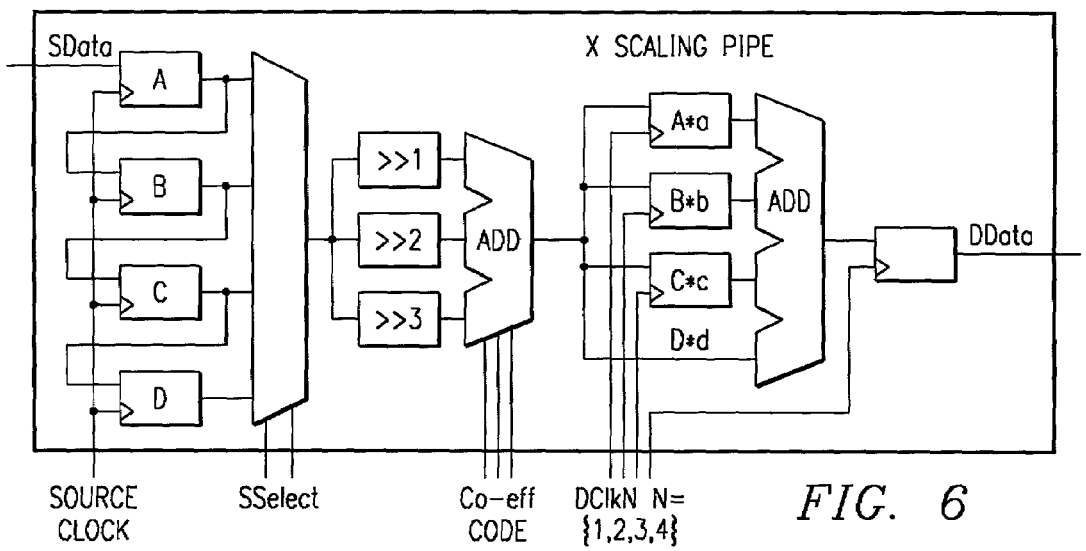
FIG. 6
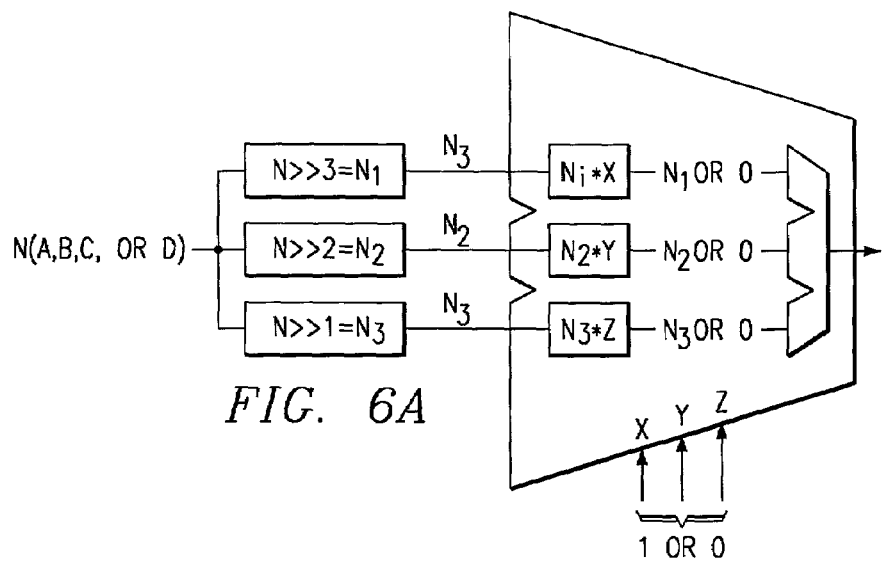
FIG. 6A
FIG. 6B
| INPUT N | SHIFT | ADD | N*n |
|---|---|---|---|
| 11001010 | >>1(÷2) | 1100101*1 | 1100101 |
| | >>2(÷4) | 110010*1 | 110010 |
| | >>3(÷8) | 11001*1 | 11001 |
| | | | 100000 |

QUANTIZED NONLINEAR SCALER

This application claims priority under 35 USC §119(e)(1) of Provisional Application No. 60/256,979, filed Dec. 21, 2000.

FIELD OF INVENTION

This invention relates to information data scaling and more particularly to a method of nonlinear scaling and a quantized nonlinear scaler.

BACKGROUND OF THE INVENTION

The scaling of the size of a picture by changing the number of pixels and using the values of the closest source pixels to determine the values for the resultant pixels is well know and is utilized for example to convert from VGA to other formats or to change the size of a window picture on a monitor and many other applications. Scaling is also done for other types of data elements such as digital samples of audio signals. Quantization makes for a lower cost scaler. One efficient type of scaler is a low cost 4-tap 8-phase scaler. A 4-tap scaler requires four source points (pixels, data elements, etc) for each destination or resultant point (pixel, data element,etc.). In mathematical formulation, the equation would be:

$$Q=aA+bB+cC+dD;$$

where Q is the resultant, {A, B, C, D} are the set of source points and {a, b, c d} is the set of co-efficient or weighting $$a+b+c+d=1;$$

Normalization requirement.

In graphical form, the picture would look like what is shown in FIG. 1.

In this FIG. 1, 9 pixels are scaled down to 6 pixels, the scaling ratio is 3:2.

An 8-phase scaler restricts the resultant point to one of eight positions (i.e. eight sets of weighting values for each of the source points) between any two adjacent source points. FIG. 2 drawing demonstrates an 8-phase scaler. The points {p,q,r,s,t,u,v,w} represent the eight resultant positions that are the only resultant points that may exist between source points {w−1, w}.

A 4-Tap 8-Phase scaler would use four source pixels {w−2, w−1, w, w+1} to calculate every resultant pixel, and each resultant pixel's position would be restricted to one of the eight resultant pixel positions between source pixels w−1 and w.

Co-efficient Quantumization:
In the equations:

$$Q=aA+bB+cC+dD;$$

where Q is the resultant, {A, B, C, D} are the set of source points and {a, b, c d} is the set of co-efficient or weighting values for each source.

$$a+b+c+d=1;$$

Normalization requirement.

In Theory, {A,B,C,D} is allowed to be any real numeric value. In practice, the set {A,B,C,D} is fixed to a set of all real whole numbers in a range:

$$\{0<=N<=R\}$$

where N=the pixel value and R is the maximum value allowed for any pixel value.

Where as {a, b, c, d} is always restricted to the range:

$$\{0<=n<=1\}$$

where n=a co-efficient, in both theory and practice. In theory, n may be any value as long as it stay's within the defined range. In practice it is desirable to restrict n to a limited set of values. In effect quantizing the values of n. The reason for applying this restriction to the co-efficient values is cost. In hardware functions like multipliers and dividers are big and costly. By quantizing the co-efficient values, smaller multipliers can be used and all dividers can be completely eliminated.

The following example of a simple Linear 4-tap 8-phase scaler will best illustrate these concepts in connection with FIG. 3.

Linear Scaler

For a linear 4-tap 8-phase scaler, the values of the a and d quantized co-efficient values would be {0, $2/64$, $4/64$, $6/64$, $8/64$, $10/64$, $12/64$, $14/64$, $16/64$}, and for b and c would be {$16/64$, $18/64$, $20/64$, $22/64$, $24/64$, $26/64$, $28/64$, $30/64$, $32/64$} for each of the eight resultant phase points. To generate pixel p, the equation would be:

$$p=(^{14}/_{64})A+(^{30}/_{64})B+(^{18}/_{64})C+(^{2}/_{64})D$$

where $^{14}/_{64}+^{30}/_{64}+^{18}/_{64}+^{2}/_{64}=1$
q would be:

$$q=(^{12}/_{64})A+(^{28}/_{64})B+(^{20}/_{64})C+(^{4}/_{64})D$$

where $^{12}/_{64}+^{28}/_{64}+^{20}/_{64}+^{4}/_{64}=1$
and so on for r, s, t, u, v, and w.

Each co-efficient value has been quantized to a value that is divisible by 2 and the normalization requirement has not been violated. If we now define a normalization value of 64 and multiply each coefficient to that value we see that:

$$(a*64)+(b*64)+(c*64)+(d*64)=64=a+b+c+d$$

where (i*64=i);
is a true statement for each of the eight phase points {p,q,r,s,t,u,v,w}.

The drawing of FIG. 3 shows the eight phases between sources B and C. Each phase has a tap point for each of the four closest source pixels {A, B, C, D}. Eight phases times four taps equal a total of 32 possible tap points. In the drawing, the co-efficient curve is centered over the source pixel C (i.e. resultant pixel w in the theory above). As can be seen, when the resultant pixel coincides with source pixel C, the co-efficient set is {0, $^{16}/_{64}$, $^{32}/_{64}$, $^{16}/_{64}$}, which are values of the curve over source pixels A, B, C and D. If the co-efficient curve is shifted up by $1/8^{th}$ pixel, the center of the curve will coincide with source pixel [C −⅛] (i.e. resultant pixel v) and the values of the co-efficient curve directly over pixels A, B C, and D would be {$^{2}/_{64}$, $^{18}/_{64}$, $^{30}/_{64}$, $^{14}/_{64}$}. The co-efficient set {a,b,c,d} can be generated for each of the eight phases by shifting the co-efficient curve up in $1/8^{th}$ pixel increments and recording the value of the curve directly over each of the four source pixels. Note that the normalization value is 64 or 2 to the $6^{th}$ power (we will get into the importance of this more when we start talking about the hardware implementations). The table of values on the left side of the drawing is a table of all the quantized normalized co-efficient values {a,b,c,d} for each of the 8 resultant phase points {p,q,r,s,t,u,v,w}. Nine rows are shown in the table to show that the co-efficient values for resultant point (w−1) are the same as those for resultant point (w). The drawing shows that w−1. a=w.b. That is because when (w−1) is being calculated (A=w−3, B=w−2, C=w−2, D=w) where as when (w) is being calculated (A=w−2, B=w−1, C=w, and D=w+1). In reality the table has only eight rows, we are just trying to demonstrate the repetitiveness of the pattern.

In linear scalers we can quantize the co-efficient values without distorting or approximating the true co-efficient curve. A non-linear co-efficient curve like [Sin(x)/x] has not been quantized and consequently are costly. This is because there is no way of quantizing without distorting the curve. Similarly other nonlinear curve scalers are costly and have not been quantized. Non-linear curves such as Sin(x)/x have a divide and requires floating point arithmetic. This requires costly processing power. It is highly desirable to provide a lower cost method to quantize non-linear curves.

SUMMARY OF THE INVENTION

According to one embodiment of the present invention we have discovered is that the curve can be distorted or approximated and that a high quality low cost filter can be designed with this approximated curve if quantumization rules are maintained.

DESCRIPTION OF DRAWINGS

FIG. 6 illustrates a low cost 4-8-Qsinc X scaler according to one embodiment of the present invention;

FIG. 6A illustrates the first adder in FIG. 6;

FIG. 6B illustrates the shift and add operation of Input A in FIG. 6A;

DESCRIPTION OF PREFERRED EMBODIMENTS

Quantum Sin(x)/x Scaler (non-linear)

A Sin(x)/x scaler is considered to be a costly scaler, but the quality is extremely high. Sinc(x) (standard notation for Sin[x]/x) is costly because of the divide operation. Such a divide operation would require floating point arithmetic. Further, the scaler is dividing a non-linear fractional value by a linear integer value. Using look up tables to eliminate the divide operation is still very costly because of the precision required to get a realistic representation of the sinc(x) co-efficient curve. An alternative approach is a Quantum Sinc(x) or Quantized Sinc solution. According to the teachings herein a very good quality low cost scaler is implemented using a 4-tap 8-phase Quantized Sinc algorithm (4-8-QSinc). The co-efficient curve of a 4-8-QSinc filter is not a true Sinc curve, but rather an approximation of one.

Figure 1:
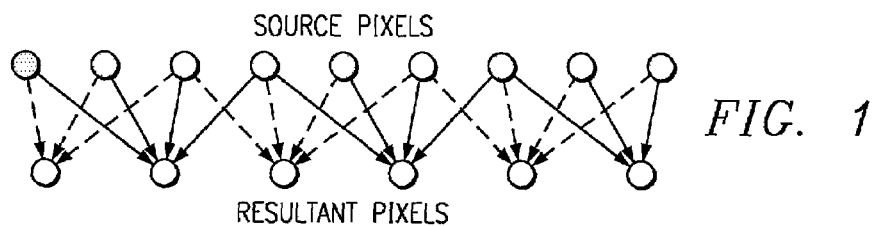
FIG. 1 illustrates a 4-tap scaler according to prior art.
Figure 2:
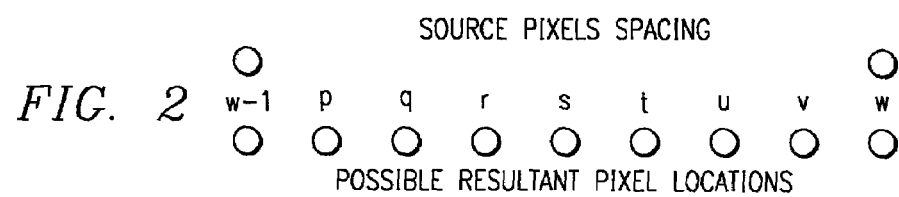
FIG. 2 illustrates an 8-phase scaler.
Figure 3:
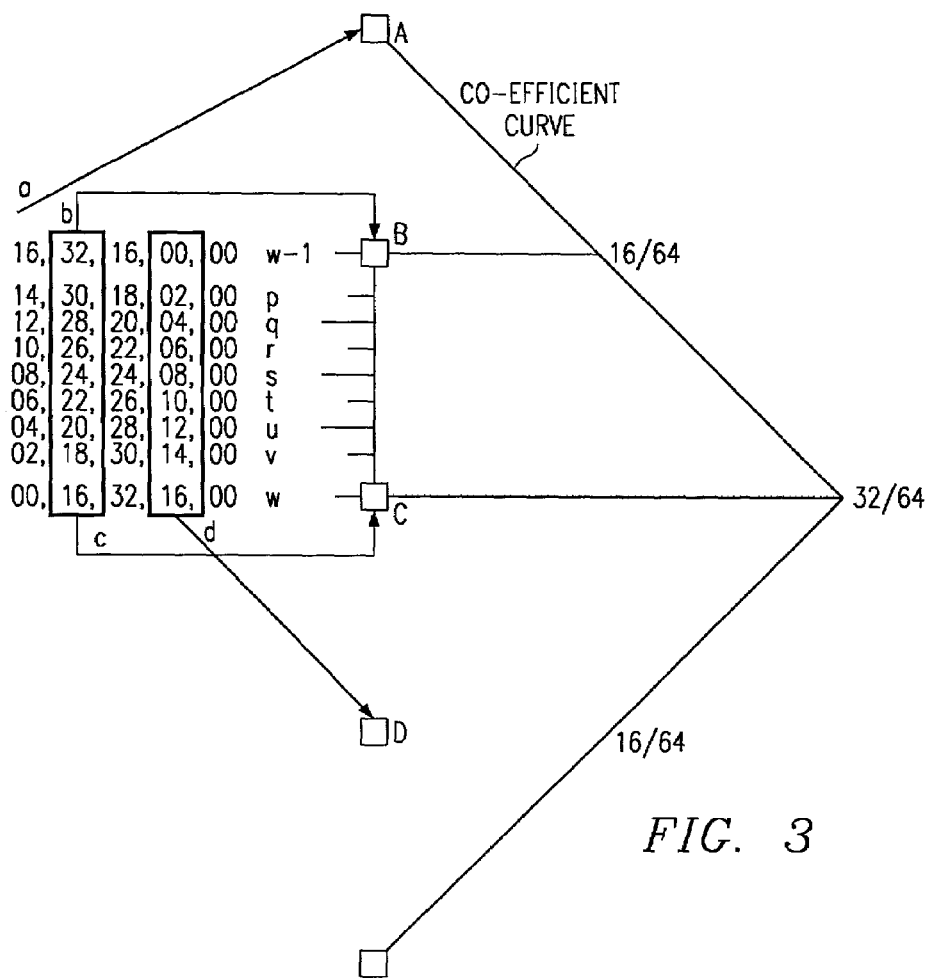
FIG. 3 illustrates co-efficient quantumization for a linear scaler.
Figure 4:
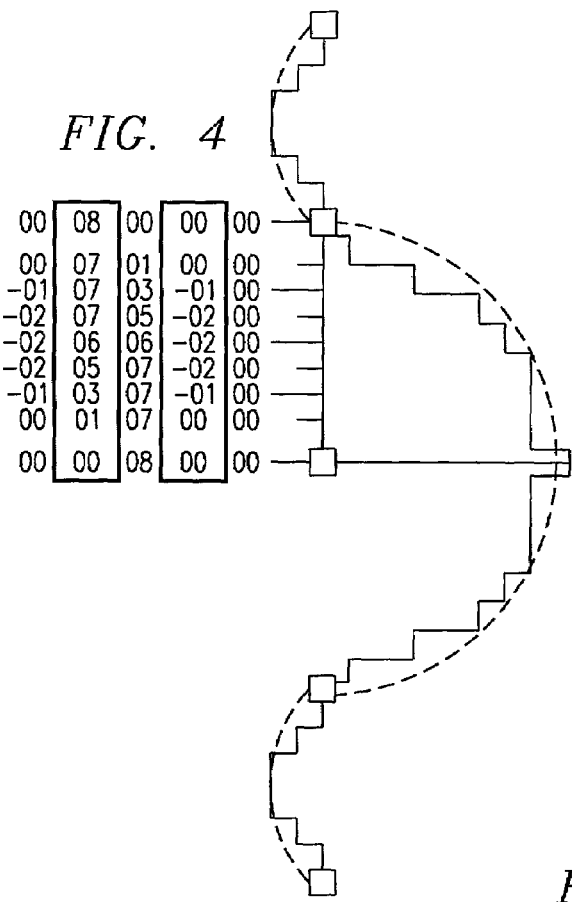
FIG. 4 illustrates a first approximation for a Q-sinc filter.
Figure 5:
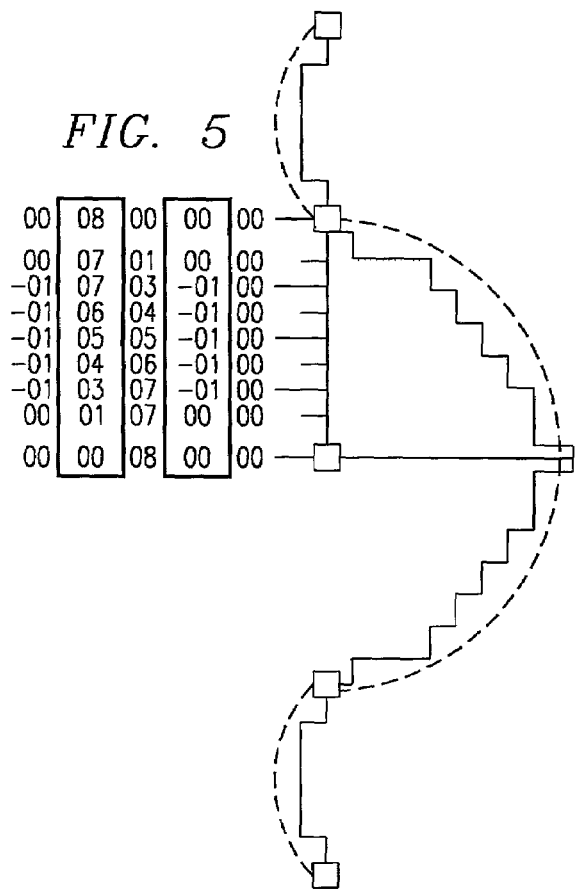
FIG. 5 illustrates a second approximation for a Q-sinc filter.

The drawing of FIG. 4 and FIG. 5 shows the theory being applied to a 4-8-QSinc co-efficient curve with two different approximation curves. Each of FIGS. 4 and 5 is using a different approximation curve (the solid line curves) to approximation the QSinc co-efficient curve. The approximation fits the phase curve as close as possible to the true curve and maintains a value of one when you add up the coefficients. The dotted line superimposed on the drawings is the true Sinc curve. Both curves were verified by software simulation to yield very high quality output images that were approaching true Sinc(x) quality. The arguments and reasoning used to derive the values of the elements in the coefficient tables to the left of each of the two curves are the same as those used to derive the values of the coefficient table described in the section titled "Linear Scaler" above. The only difference is that a different normalization value is used. Instead of normalizing to 64, we normalize to 8 (8 points to the next source), restricting the values of {a,b,c,d} to be in the range (maintain a value of one when you add up the coefficients):

$$-\tfrac{1}{4} <= n <= 1$$

where n={−2/8, −1/8, 0, 1/8, 2/8, 3/8, 4/8, 5/8, 6/8, 7/8, 1} when normalized this becomes:

$$-2 <= n <= 8$$

where n={−2, −1, 0, 1, 2, 3, 4, 5, 6, 7, 8}

Also note that not all the quantum values can be used, (2 and 4 are not in one table, and −2 and 2 are not in the other). This is because the normalization rule $$a+b+c+d=1$$

(or in this case a+b+c+d=8)

still has to be maintained. So all the elements in each row in the co-efficient tables have to sum to 8. The negative values are present because the true Sinc co-efficient curve also has negative values. Simulation models have demonstrated that the approximation curves can be very poor approximation and still maintain very good output quality. FIG. 4 shows a first approximation curve and FIG. 5 shows a second approximation curve for a Q-Sinc filter. Both sets of coefficients have been proven to yield very good quality scaled images. The values in the columns in FIGS. 4 and 5 are over 8 or for the example of the middle point of 00,00,08,and 00 the values are 0/8,0/8,8/8,and 0/8.

As long as a certain set of rules are adhered to, any number of co-efficient curves could be used. The two curves here just happen to be QSinc (i.e. Quantitative Sinc(x)) co-efficient curves. Other co-efficient curves could be quantized or approximated just as easily. As long as the following set of rules are followed, any co-efficient curve can be quantized. Making it possible to apply quantumization techniques to even non-linear co-efficient curves now.

The key to a non linear curve approximation is that it, like the true curve, must remain symmetrical about its centerline. To maintain this symmetry the follow rules need to always be followed in designing a quantized scaling filter.

1. The sample data must be consistent. If it's video or graphic data, all input pixels have to be of the same size and equally spaced. In the case of audio data, all samples have to be taken with a consistent sampling clock. Other forms of data have to be consistent in their appropriate domains as well.

2. The quantization points must be consistent. For example an 8-phase scaler has eight quantization points between each and every adjacent pair of pixels.

3. The co-efficient curve must be symmetric about its centerline.

4. The quantization values must be selected so that the sum of all the co-efficient values in the co-efficient curve over all the source points for a given resultant point is always equal to the normalization value. The normalization value selected for a given approximation curve will be driven by this rule.

The following is the description of a simulation model of a 4-Tap N-phase scaler:

The following is a description of the simulation we used to verify the three theoretical scalers described above. The eight phase scalers used the linear and sin(x)/x formulas to retrieve the four values for a, b, c and d in the following "new pixel" formula. The values of A, B, C and D are the closest four input pixels relative to the step position of the output pixels (four horizontal pixels for x stepping and four vertical pixels for y stepping). (a+b+c+d) is the normalization (a value indicating how many bit positions to shift the accumulated value to the right) value.

$$(aA+bB+cC+dD)/(a+b+c+d)=\text{new pixel}$$

The general algorithm is:

```
For each scan line
{
For each output pixel
{
skip step value input pixels                    // skip an integer step size
add the fraction to the accumulator             // the fractional value is added to an accumulator
If the accumulator > 1                          // accumulator roll over
{
    decrement the accumulator                   // clear roll over flag
    skip 1 input pixel                          // add extra pixel to skip size
}
mask the accumulator to acquire the phase value // the simples mask will zero out all but the three
                                                // MSB bits of the accumulator for an 8 phase.
use the phase value as the index into the co-efficient table and acquire a, b, c, and d
(aIP₀ + bIP₁ + cIP₂ + dIP₃)/(a + b + c + d) = output pixel
next output pixel
}
next scan line
}
``` derive each of their prospective co-efficient tables. The size of each co-efficient is manipulated during set-up to make sure they fit into 5 bits (including the sign bit) and to make sure the final division (normalization) is by a power of 2 (a shift). The simulation allows us to more accurately gauge the difference in quality of these scalers when difficulty of implementation in hardware is held almost constant. This is an accurate simulation model of the preferred hardware design and from it the reader can easily make the following conclusion.

1. The basic design of all three scalers are the same, the only differences is the co-efficient values used.

2. A low cost scaler that can be used as both a bi-linear and 2d Qsinc scaler by program control (a single programmable bit could select which co-efficient table to select from) can be realized.

3. A number of other scaling and filtering variations could be achieved by making the co-efficient table programmable.

4. Higher phase (sixteen and thirty-two phase for example) scalers can be derived based on the same concepts used for these eight phase scaler.

There are two basic formulas used to generate scaled images. The formulas will be described in a single dimension but are applied in a two pass approach to get both x and y scaling. The formula for generating the step interval and phase is:

Originalxdimension/Scaledxdimension=an integer step size+a fractional value

For each output pixel, the step size is used to determine how many input pixels to skip over. For each output pixel, the fractional value is added to an accumulator. If the accumulator rolls over (becomes <1), an extra input pixel is skipped. This accumulator is masked to produce the phase value in the desired range (0–7 for 8 phase scalers). The phase value is used to index into a co-efficient table and As was stated earlier, in the eight phase scalers, the values of a, b, c and d were chosen such that they are each <=5 bits in size and add up to a power of two (8=2 to the $3^{rd}$ power). This will let our implementation use a smaller multiplier, smaller adders and a shift instead of a divide.

Figure 7:
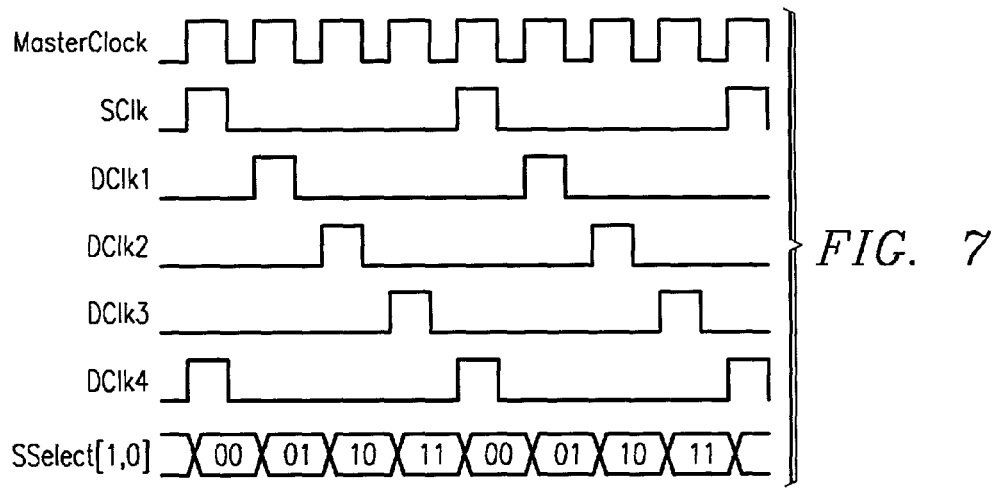
FIG. 7 is a timing diagram for the X-scaler of FIG. 6.

Referring to FIG. 6 there is illustrated a low cost 4-8Qsinc Xscaler according to one embodiment of the present invention. The timing is illustrated in FIG. 7. A serial stream of source data (SData) is walked through a series of latches (A, B, C, and D) with a source clock (SClk). The content of the data in each latch (A,B,C, and D) corresponds to the variable of the same notation {A,B,C,D} in the formulas above. Two select lines (SSelect[1, 0]) present the content of the four latches (A, B , C and D) one at a time to a limited fixed multiplier. At the same time, the appropriate co-efficient code (a, b, c, or d) is presented to the multiplier. The multiplier comprises the shifts and adds in the first adder. The shift <<1 is a divide by 2, the shift <<2 is a divide by 4 and the shift <<3 is a divide by 8. The first adder is illustrated in FIGS. 6A and 6B. The input N in FIGS. 6A and 6B represents the input from each of the latches A,B,C or D The input N shifted by 3 (<<3 or divide by 8) equals N1, the input N shifted by 2 (<<2) or divide by 4) equals N2 and the input N shifted by 1 (<<1 or divide by 2) equals N3. The coefficient code n is provided by lines X,Y and Z in FIG. 6A provide either a 1 or 0 at the lines X, Y and Z such that the input at N1 for example is multiplied by a 1 or 0, N2 is multiplied by a 1 or 0 and N3 is multiplied by a 1 or 0. The outputs N1=N1 or 0, N2=N2 or 0 and N3=N3 or 0 are added to produce N*n for the example. This process is repeated for the four latched inputs of A,B,C, and D to give the products A*a,B*b,C*c, and D*d. The first three products are latched into latches A*a, B*b, and C*c. After the fourth source latch (D) is presented to the multiplier, and it's product is at the multipliers output, the content of the three latches (A*a, B*b, and C*c) are added together with the product of the D*d operation. The sum of these four products is the output or destination (DData) data.

Not shown in FIG. 6 (for brevity and because they are considered to be straight forward processes) are:

1. Multiplexing circuitry to parallel load the first pixel of every line into the four latches (A, B, C, and D) with just one clock cycle.

2. Details about the two adders.

3. The normalization circuitry after the last adder (block with DData as output), because in hardware this is just a LSBs truncation.

The timing diagram of FIG. 7 shows how the clocks control the flow of the operation.

The X scaler Co-efficient code is generated by a Co-efficient Generator (XCoGen). The XCoGen is composed of a register (Step Reg), a counter, and an adder. The register contains a 16-bit value, 8 bits of an integer part and 8 bits of a fractional part. The value to be loaded into this register is determined by dividing the Source images X size (SrcXSize) by the Destination images X size (DestXSize).

StepReg=SrcXSize/DestXSize

Note that this is not the scale factor, but rather the inverse of the scale factor.

The counter is an 8-bit counter. On every Source Horizontal Sync (SHSync), the counter is reset to zero. On every SClk after SHSync goes inactive and the counter reset is complete, the content of the fractional portion of the Step Register is added to the content of the counter. The counter continues to increments by this amount on every SClk until SHSync goes active again. Counter roll over will not affect the scaler in any way. Bits 7, 6, and 5 of the counter are all that is used by the scaler. The bits 7,6 and 5 are the bits or inputs X,Y and Z in FIG. 6A. The following table shows the relationship between the phase and the co-efficient values (a,b,c,d}. The binary values of the left three bits under the phase column and the left four bit under columns a,b,c, and d of the co-efficient table are the only ones the XCoGen has any interest in. One of the four bits represents the sign bit. The values are in ones complement notation. The block diagram of the XCoGen in FIG. 8 shows how the three bits (Phase[7–5]) are used to point to (or select) the four co-efficient values from the co-efficient table.

Figure 8:
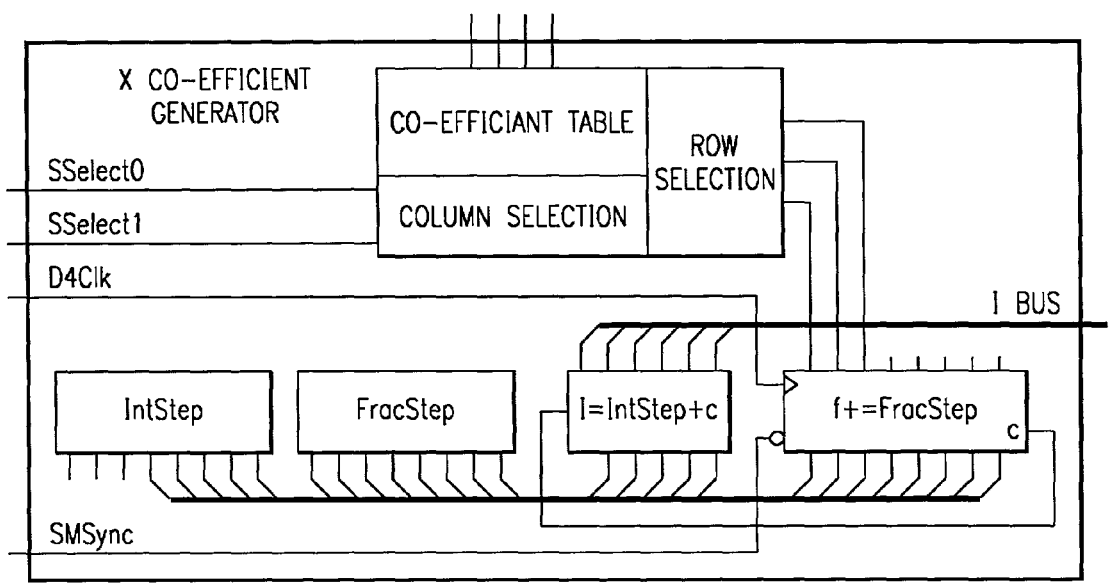
FIG. 8 is a block diagram of the cogeneration portion of the co-efficient generator.

The block diagram of FIG. 8 shows the Co-efficient generation portion of XCoGen. This is a diagram of a down scaling scaler. The table is addressed using the phase value for the row and the column is selected by SSelect0 and SSelect1. An up scaling scaler would not need an IntStep value. An up scaler would also need a must faster clock, because the ratio of SClk to the other clocks will be must higher. The scale factor of a real-time up scaler is determined by the clock ratios. It should also be noted that this basic design could be used for a combinational (up/down) scaler.

Not shown in the drawing of FIG. 8 (for brevity and because they are considered to be straight forward processes) are:

1. The method, data paths, and mechanism for loading the Step register with program data.

2. Details about the I adder, the f counter, and the b, c and d adders.

In the block diagram of FIG. 8 note that the Integer value of the Step register is added to the carry bit of the counter and shipped out via the 6-bit IBus. The IBus is used by the timing controls to generate all the clocks (other than the SClk) and other timing controls in the design.

Figure 9:
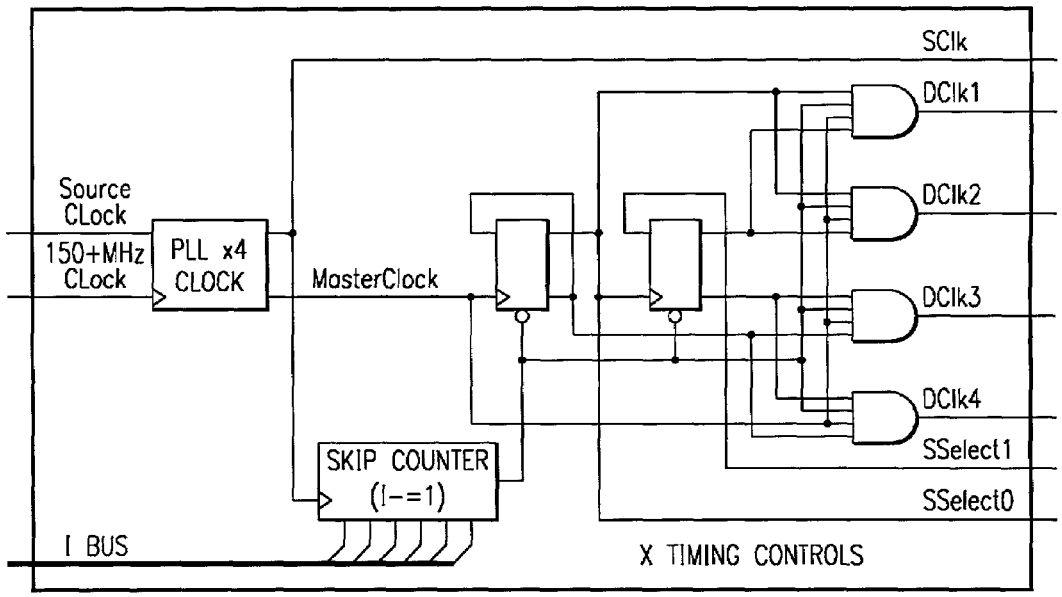
FIG. 9 illustrates the timing controls for a linear X-scaler.

The timing controls for a linear Scaler is illustrated in FIG. 9 and is composed of a small down counter (skip counter), a couple of flip-flops, a few gates, and a Phase Lock Loop (4×PLL) circuit for generating the MasterClock which has to run at four times the frequency of the incoming SourceClock. The SClk clock is synchronized to the Source-Clock by the PLL. If the value on the IBus is greater than one, the next resultant pixel is not generated in the current SClk cycle. On every SClk cycle the value in the Skip Counter is decremented by one until the counter counts down to zero. When the Skip Counter has a value of zero, it allows the flip-flops to run through a four-count cycle. The DClk1, DClk2, DClk3, and DClk4 are generated from this fourcount cycle. The SSelect [1, 0] are also generated by this fourcount cycle. When the Skip Counter has a nonzero value, the fourcount cycle is stalled. The incoming data (SData) is shifted through the four input latches (A, B, C and D), but a new resultant data (DData) is not generated. In FIG. 8 (X Co-efficient Generator), note that a new value may appear on the IBus at the end of each four count cycle (clocked by DClk4). Because this is a down scaler, the IBus will always be loaded with a non-zero value at this time (unless the IntStep register was improperly programmed). This will reset the X Timing Controls (XTC) four count cycle mechanism. In the reset state, SSelect [1, 0] will, equal 00 and DClk1, DClk2, DClk3, and DClk4 will all be low.

| 4-8-Qsinc Co-efficient Table | | | | | | | | |
|---|---|---|---|---|---|---|---|---|
| Decimal view | | | | Binary view | | | | |
| Phase | a | b | c | d | Phase | a | b | c | d |
| 0 | 0 | 1 | 0 | 0 | 0000 0000 | 0000 0000 | 1000 0000 | 0000 0000 | 0000 0000 |
| 1/8 | 0/8 | 7/8 | 1/8 | 0/8 | 0010 0000 | 0000 0000 | 0111 0000 | 0001 0000 | 0000 0000 |
| 2/8 | −1/8 | 7/8 | 3/8 | −1/8 | 0100 0000 | 1111 1111 | 0111 0000 | 0011 0000 | 1111 1111 |
| 3/8 | −1/8 | 6/8 | 4/8 | −1/8 | 0110 0000 | 1111 1111 | 0110 0000 | 0100 0000 | 1111 1111 |
| 4/8 | −1/8 | 5/8 | 5/8 | −1/8 | 1000 0000 | 1111 1111 | 0101 0000 | 0101 0000 | 1111 1111 |
| 5/8 | −1/8 | 4/8 | 6/8 | −1/8 | 1010 0000 | 1111 1111 | 0100 0000 | 0110 0000 | 1111 1111 |
| 6/8 | −1/8 | 3/8 | 7/8 | −1/8 | 1100 0000 | 1111 1111 | 0001 0000 | 0111 0000 | 1111 1111 |
| 7/8 | 0/8 | 1/8 | 7/8 | 0/8 | 1110 0000 | 0000 0000 | 0000 0000 | 0111 0000 | 0000 0000 |

Not shown in the drawing of FIG. 9 (for brevity and because they are considered to be straight forward processes) are:
1. Details about the skip counter.
2. Details about the PLL.

Figure 10:
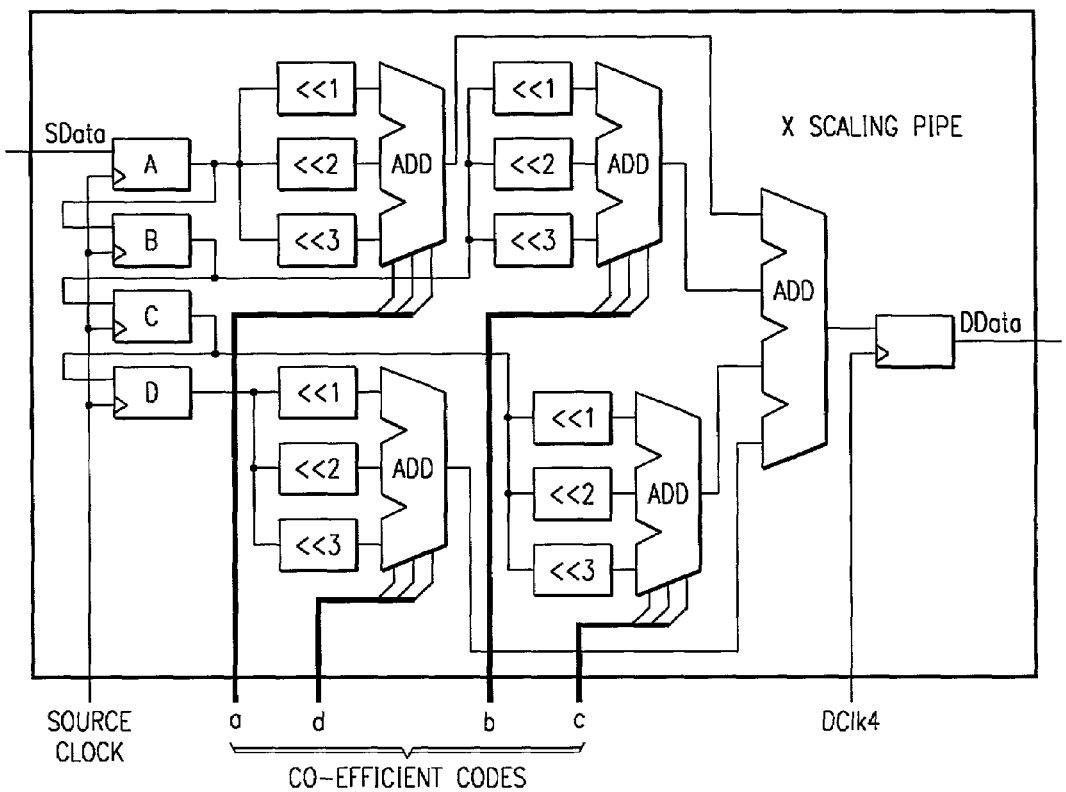
FIG. 10 illustrates a scaling pipe modified for speed.

The Scaling Pipe of FIG. 6 can be modified for speed as illustrated in FIG. 10 to run four parallel pipes from the four latches (A, B, C, and D) to the DData Out adder. This will eliminate the need for a PLL and will allow the Scaling Pipe to run at the Source Clock rate. X Timing controls is reduced to a Skip Counter and the two clocking signals SClk and DClk4. The column selection of the Coefficient table is also eliminated and all four co-efficient values are output to the scaling pipe concurrently. The Coefficient table outputs four co-efficient values per clock cycle (one for each of the four parallel pipes). The overall design becomes simpler, but will cost more. There will also no longer be a need for an external clock. All internal clocking will be derived from the Source Clock. This will most likely be the version of the X Scaler that most designs will end up using. For the extra cost you get both a faster scaler and a much more simplified one. The following drawing shows the modified X Scaling Pipe. The drawings of the Timing Controls or the Co-efficient Generator are not provided because the modifications to them is straight forward and easy to determine.

First Pixel Compensation

There are a number of options as to how to generate the first pixel of DData.

1. Aligned to Pixel first pixel of the Source Data. If the first pixel of the source is latched into all four latches (A, B, C, and D) on the first Source Clock of each line, it makes no difference which set of co-efficient (a, b, c, d) values are used. The First pixel out on Ddata for that line will equal the first pixel in at SData.

2. Offset first pixel by the fractional step value. Instead of loading the fracStep adder with a zero value, load it with the first step error (fractional) value (the FracStep register).

3. Have an independent offset value. This would require another register, so that the program has the freedom to determine what the first step error (fractional) value should be. Instead of loading the fracStep adder with a zero value, load it with the independent first step fractional value (an offset register).

Using four parallel Scaling Pipes (see Trading Cost for Speed) and replacing the Skip Counter with a Repeat Counter gives this design the ability to zoom up images. The PLL has to be geared for the maximum scale factor.

A Y Scaler is a slight bit more complicated and a lot more costly than a X Scaler. To start with a X Scaler scales a serialized stream of data (one stream, several tap points), while a Y Scaler scales parallel streams of data (several streams, each a different tap point). A Y Scaler also might have to deal with interlaced data. Most important, a Y scaler has stored data in it's scaling pipe. There are a number of design options. The best one for any application depends upon the limitations and restrictions the application places on the design. There are a number of options. The description concentrates on the scaling pipes and leave the reader to understand the timing controls and co-efficient generator, being there is not that much difference in these functions between the X Scaler and Y Scaler.

It is recommended that the Y Scaler be placed after the X Scaler in all designs.

Option 1: Line Buffering

Figure 11:
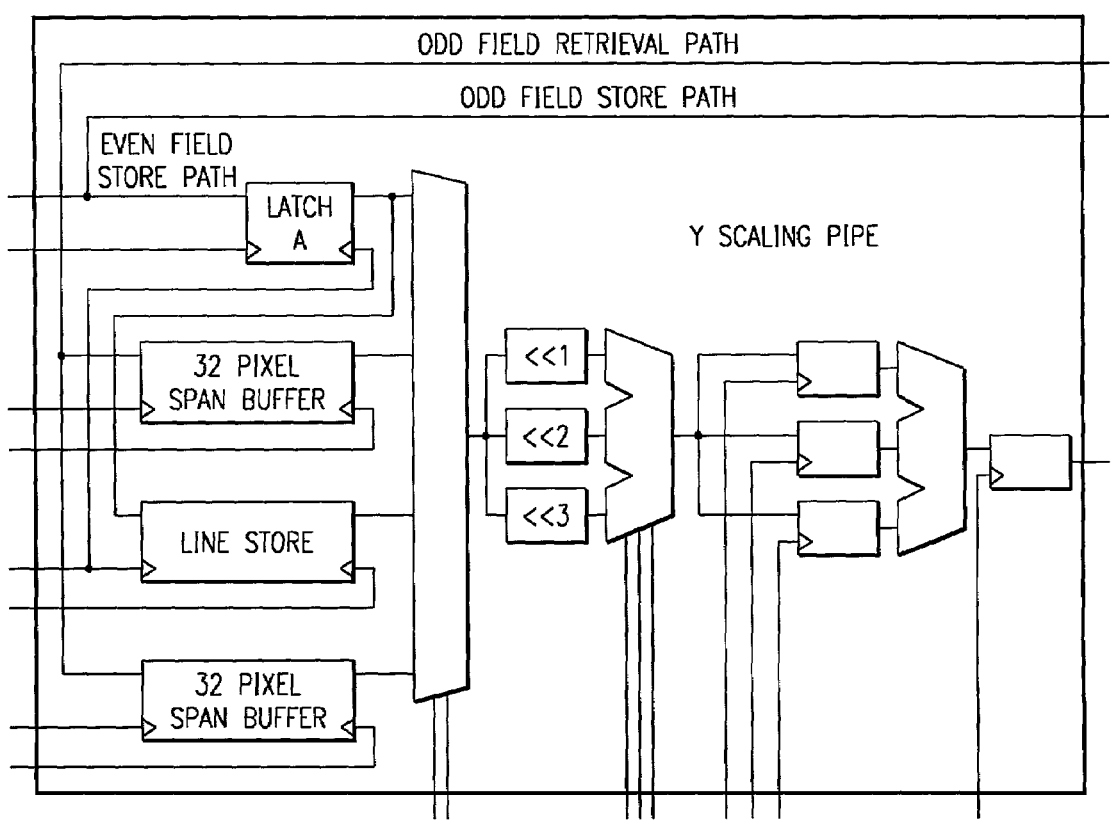
FIG. 11 illustrates a 4-tap scaler according to Option 1 and Option 2.

For a 4-Tap scaler according to Option 1, this design illustrated in FIG. 11 requires three full line buffers. This design is almost identical to the X Scaler. The only difference in the scaling pipe is that three of the four latches (B, C, and D) are replaced with FIFO buffers.

There are actually a number of variations to this design. The one shown is for progressively scanned data. Even though this design could be modified (in the timing controls) to support interlaced data, there are better ways of dealing with interlaced data. This design would not allow the different fields (even lines and odd lines) to be interpolated as one frame. Each field would have to be interpolated (scaled) independent of each other. There are tricks you can play with the Y step value to determine what co-efficient values to use. But most of these schemes require the use of a programmable co-efficient table.

Option 2 Retrieval

Option 2 is illustrated in FIG. 11 is a lot like Option 1. The difference being, the odd lines are retrieved from memory. This option is targeting interlaced data. The odd field is scaled in X only and saved to memory in an odd field storage area. During even field time, the even field is scaled in X line by line, the odd field lines are retrieved from the odd field storage area in memory, and then both fields are merged to do the Y frame scaling.

This design requires a feed back path from memory and requires at least enough memory to store one field of data. If the device this design is in does not have access to the memory, then the interface between the device that controls the memory and the device this design is in need to work together to achieve the common goal of scaling a full frame of interlaced data. This has to be done with no memory addressing controls being controlled in the interface itself. Only data framing controls (i.e. V-sync and H-sync signals) can be used.

Another Option 2 also illustrated in FIG. 11 referred to herein as span retrieval is similar to the line retrieval option. The difference being that only one full line buffer is required. In this design, the odd field data is retrieved from the frame buffer in short 32 pixel spans. The down side for this design is that twice as much data has to be retrieved from the frame buffer (each pixel is retrieved twice). This makes the clocking a little more complicated. The up side is that it eliminates two huge line store buffers. Other than that every thing else is the same.

Other Y Scaling Considerations

Invest Telecine Process

Film is a 24 frame per second media. When converted to video (a 30 frame per second or 60 field per second media), the 24 frame per second non-interlaced film media has to be reformed as 60 interlaced fields per second. This conversion is called a telecine process and is done in the studio when the content (the movie) is put on videotape. The following table shows the before and after media.

| Frames (24) | 1 | | 2 | | 3 | | 4 | | 5 | | 6 | |
|---|---|---|---|---|---|---|---|---|---|---|---|---|
| Fields (60) | 1O | 1E | 2O | 2E | 3O | 2E | 3O | 3E | 4O | 4E | 5O | 4E | 5O | 5E | 6O | 6E | 6E |

The interlaced video media has visual problems when played on a progressive scan display. An NTSC encoder that uses either Options 2 or 3 has all the information required to determine when the [(N+1)O, NE] frame occurs. It could detect and selectively reject these frames. In effect, converting back to a 24 frame per second media. While the subject invention illustrates Q-sinc filter for scaling video and graphics data many other scaling embodiments are taught herein for not just video but all forms of scaling data elements.

In accordance with the present invention the steps are 1) generate a quantized table for any continuous coefficient curve using the four rules of 1) The sample data must be consistent. If it's video or graphic data, all input pixels have to be of the same size and equally spaced. In the case of audio data, all samples have to be taken with a consistent sampling clock. Other forms of data have to be consistent in their appropriate domains as well. 2) The quantization points must be consistent. For example an 8-phase scaler has eight quantization points between each and every adjacent pair of pixels. 3) The co-efficient curve must be symmetric about its centerline. 4) The quantization values must be selected so that the sum of all the co-efficient values in the co-efficient curve over all the source points for a given resultant point is always equal to the normalization value. The normalization value selected for a given approximation curve will be driven by this rule. Apply to the table in hardware using a step counter to locate the coefficient in the table. Apply the coefficient to a scaling pipeline to get the scaled data.

While in the above description the curve approximated is for QsincX scaler any type of continuous nonlinear curve can be approximated in a similar manner. For a VGA scalar the coefficient curve may be $Cos^2[(Pi)/2]$. Various modifications, alternative constructions, and equivalents may be used within the scope of this invention.

What is claimed is:

1. A method of providing a low cost quantized nonlinear continuous coefficient curve scaler for converting consistently spaced sampled input data into consistently spaced resultant scaled data comprising the steps of:

provinding a quantized coefficient table representing an approximation of the nonlinear continuous curve, said table including a plurality of sets of n coefficients, each set of n coefficients summing to a normalization value of an integral power of 2, and each coefficient of each set of n coefficients being an integral addend of said normalization value;

applying said table in hardware to successively locate the sets of n coefficients in the table; and applying the located set of n coefficients to n corresponding sampled input data via a scaling pipeline by summing the product of each of said n coefficients and said corresponding sampled input data to get resultant scaled data.

2. The method of claim 1 wherein said nonlinear curve is $sin(x)/x$.

3. A quantized nonlinear curve scaler comprising:

a series of latches for latching a stream of source data wherein the content of the latches is the source data elements;

a quantized coefficient table storing an approximation of the nonlinear continuous curve, said quantized coefficient table including a plurality of sets of n coefficients, each set of n coefficients summing to a normalization value of an integral power of 2, and each coefficient of each set of n coefficients being an integral added of said normalization value;

a shift and add multiplier comprising a first adder and a shifter for shifting and adding contents of each latch by corresponding coefficients provided by said quantized coefficient table to produce coefficient products of the source data elements; and a second adder for summing coefficient products from the series of latches to provide the resultant data value.

4. The quantized nonlinear curve scaler of claim 3 wherein:

said nonlinear curve is $sin(x)/x$.

* * * * *